United States Patent Office 3,494,786
Patented Feb. 10, 1970

3,494,786
COATED PERPHTHALIC ACID AND METHOD OF MAKING SAME
Donald R. Nielsen, Corpus Christi, Tex., assignor to PPG Industries, Inc., Pittsburgh, Pa., a corporation of Pennsylvania
No Drawing. Filed Dec. 19, 1966, Ser. No. 602,557
Int. Cl. B44d 1/44, 1/40
U.S. Cl. 117—100          6 Claims

ABSTRACT OF THE DISCLOSURE

Disclosed are granulated compositions of perphthalic acid cores encapsulated in protective coatings of hydrated magnesium sulfate having a controlled low magnesium sulfate heptahydrate content below about 10 percent. Such products are provided by heating the encapsulated product appropriately, e.g., at 30° C. to 70° C., until the heptahydrate content is reduced to the desired level. These products are suitable for formulation with alkaline materials including synthetic organic detergents.

BACKGROUND OF THE INVENTION

Field of invention

This invention concerns perphthalic acids, notably diperisophthalic acid. It more particularly deals with solid compositions of diperisophthalic acid capable of being directly admixed with synthetic detergents and their preparation.

As is described in application Ser. No. 602,558 filed on Dec. 19, 1966, in the names of Jan P. Lund and Donald R. Nielsen and assigned to the assignee of this application, perphthalic acids such as diperisophthalic acid can be encased in a protective shell of the hydrated inorganic salt such as hydrated magnesium sulfate to provide particles or granules capable of being directly admixed with synthetic detergent compositions without undue decomposition of the peracid and undue loss of the active oxygen content thereof. In the process described in said commonly assigned application, the encapsulation is achieved, for example, by feeding an aqueous slurry of the diperacid to a bed of magnesium sulfate suspended in a rising stream of an inert gas which sulfate is less than completely hydrated (including anhydrous magnesium sulfate) while regulating the particle size of the magnesium sulfate and the water content of the aqueous diperacid slurry. By this process, particles, usually substantially spherical granules, having an inner core of the perphthalic acid surrounded or encased in a protective coating of hydrated magnesium sulfate are produced. These products can be directly formulated with synthetic detergent compositions.

SUMMARY OF INVENTION

It has further been discovered, according to this invention, that the hydrated magnesium sulfate outer shell or encapsulating protective barrier can be modified to provide particles of even greater stability against decomposition (or loss of active oxygen content) when in admixture at warmer temperatures (e.g., 60° C.) with organic detergents or under alkaline conditions. This improvement is attained pursuant to the present invention by regulating the hydrate content of the magnesium sulfate hydrate encasing the perphthalic acid core to limit the heptahydrate content thereof to below about 10 weight percent. This, as will hereinafter be discussed in further detail, involves according to this invention recourse to special conditions of treatment, for example, subjecting the particles of magnesium hydrating encapsulated perphthalic acid prepared by the method described in said copending application of Lund and Nielsen (the disclosure of which is incorporated herein by reference) to a heat treatment above 30° C. to as high as 60° C. or 70° C. for an extended period of time, usually in excess of 30 minutes, up to one day (or even longer). Typically, heat treatment periods range between 1 and 12 hours.

Especially appropriate encapsulated product of this invention involves a diperisophthalic acid core encased in a hydrated magnesium sulfate barrier coating wherein the barrier coating contains from 0.5 to 4.0 (more notably 1 to 2.5) parts (by weight) water of hydration per part of diperisophthalic acid. This water of hydration is in the form of hydrates of magnesium sulfate, containing water of hydration in the ratio of more than 2, preferably at least about 4 moles to 7 moles of water per mole of magnesium sulfate. Thus, usually the barrier shell contains from 0.5 or 1.5 to 2 or more (rarely above 5) parts by weight magnesium sulfate per part of diperisophthalic acid in these preferred products.

With respect to establishing the magnesium sulfate heptahydrate content below 10 percent by weight of the hydrated magnesium sulfate, it is important to recognize that the overall ratio of water of hydration and magnesium sulfate is not necessarily the sole determinant in insuring this desired minimum of heptahydrate. According to this invention, it is important that the magnesium sulfate heptahydrate content be minimized, to wit, to below 10 weight percent magnesium sulfate heptahydrate, and that the overall water of hydration content be up to 5, ideally 3 to 4, moles per mole of magnesium sulfate. Thus, a hydrated magnesium sulfate encapsulating composition can have the appropriate 3 to 4 moles of water of hydration per mole of magnesium sulfate and still contain well above the 10 percent heptahydrate tolerable in accordance with the present invention as, for example, by being composed of a high monohydrate and heptahydrate content (equimolecular concentrations of monohydrate and heptahydrate, for example, theoretically providing 4 moles water of crystallization per mole of magesium sulfate).

The following examples illustrate the manner in which the present invention may be practiced:

EXAMPLE I

A 7 foot high, 6 inch internal diameter tube provided the container in which a fluidized bed of magnesium sulfate monohydrate was established. A porous alumina plate near the lower end of the tube served to support the bed. Below the alumina plate, means was provided for feeding fluidizing gas. About 2 to 2½ feet above the alumina plate a nozzle means was provided for introducing diperisophthalic acid slurry to the bed. Using this apparatus, a fluid bed initially provided by charging 2000 grams of minus 70 mesh magnesium sulfate containing 17 weight percent water of hydration. These magnesium sulfate particles were fluidized by feeding upwardly through the porous plate nitrogen at 75 pounds per square inch pressure heated to about room temperature of 25° C. While the magnesium sulfate particles were so fluidized with nitrogen, a total of 500 grams of an aqueous slurry of diperisophthalic acid (containing 40 weight percent of the acid) was fed into the bed at a rate of between 150 and 200 cubic centimeters per minute through the atomizing nozzle (the slurry density being 1.2 grams per cubic centimeter). In this manner, particulate diperisophthalic acid encased in a hydrated magnesium sulfate shell was produced in the bed.

Screened portions of the encapsulated product produced in the bed and removed therefrom were then heated at 60° C. overnight (a period of about 8 hours). Both an unheated portion and the heated encapsulated product were then tested for their stability at 60° C. This involved mixing the heat treated and non-heat treated encapsulated products with sodium carbonate and "Beads-O'-Bleach" base (a detergent preparation obtained from the Purex Corporation Limited, which contains 63 weight percent sodium sulfate, 3 percent synthetic detergent with the balance being $NaH_3SiO_4$ and $Na_4P_2O_7$) which was screened through a 14 mesh screen. The proportions of the encapsulated diperisophthalic acid product, the "Beads-O'-Bleach" base and sodium carbonate were so adjusted that a ½ cup of the mixture would if added to a 20 gallon washing machine provide a pH 9 and 15 parts per million active oxygen. These two mixtures were placed in capped vials and stored at 60° C. for an extended period of time, after which the active oxygen content was tested to determine the decomposition rate. The following table compares the results of products so tested:

TABLE I

| Mesh Size | Composition, Weight Percent | | | Heat Treatment | Percent Decomposition/Day at 60° C. |
|---|---|---|---|---|---|
| | DPI* | $H_2O$ | $MgSO_4$ | | |
| −14+32 | 25.2 | 30.6 | 44.2 | None | 9.4 |
| −8+14 | 26.6 | 33.7 | 39.7 | ----do---- | 2.5 |
| −14+32 | 27.2 | 25.5 | 47.3 | 60° C | 4.0 |
| −8+14 | 28.7 | 28.7 | 32.6 | 60° C | 2.0 |

*DPI = Diperisophthalic acid.

As comparison of the data for the non-heat treated product with the heat treated product demonstrated, heat treatment at 60° C. achieved a pronounced reduction in the decomposition rate of the diperisophthalic acid.

EXAMPLE II

A plurality of other granulated diperisophthalic acid products encapsulated in hydrated magnesium sulfate protective shell were prepared and heat treated at 60° C. by the method described in Example I and tested according to the procedure there described with the following results:

TABLE II

| Mesh Size | Composition, Weight Percent | | Percent Decomposition Per Day at— | | | | | |
|---|---|---|---|---|---|---|---|---|
| | DPI* | $H_2O$ | 25° C. | 40° C. | 45° C. | 50° C. | 55° C. | 60° C. |
| −14+32 | 30.4 | 24.1 | .04 | .31 | .54 | 1.2 | 1.0 | 4.8 |
| −8+14 | 29.1 | 28.5 | .04 | .16 | .18 | .43 | .41 | .68 |
| −14+32 | 25.6 | 28.1 | .13 | .15 | .26 | -------- | 1.8 | 2.1-4.2 |
| −8+14 | 25.5 | 32.3 | .08 | .07 | .07 | -------- | .65 | .68 |

*DPI = Diperisophthalic acid.

The minus 14 to plus 32 screened portion of encapsulated products of Example I produced after heating at 60° C. overnight contained as determined by X-ray analysis 25 to 35 percent monohydrate, 40 to 50 percent hexahydrate and 1 to 10 percent heptahydrate and 1 to 10 percent tetrahydrate whereas the heat treated minus 8 to plus 14 portion contained 20 to 30 percent monohydrate, 40 to 50 percent hexahydrate and 1 to 10 percent heptahydrate.

As demonstrated by the foregoing examples, heat treating a magnesium sulfate hydrate encapsulated perisophthalic acid provides granulated products which can be directly mixed with solid synthetic detergents without causing serious decomposition and loss of active oxygen or, in other words, bleaching capacity of the diperisophthalic acid. There thus may be provided by virtue of the present invention compositions which contain an admixture of the characterized granules of encapsulated diperisophthalic acid or like perphthalic acids with dry granulated or particulate detergents, notably synthetic organic detergent compositions including alkaline additives. If it is desirable to avoid segregation of the detergent from the bleaching component, the respective particles of the bleaching component and the detergent component are sized approximately the same.

In general, the encapsulated particles are substantially spherical and sized from between 0.1 to 5 millimeters in diameter. Larger particles are feasible and can be produced pursuant to the present invention. In general, the core of such spherical granules will range in size from 0.1 to 2.0 millimeters in diameter while the thickness of the encasing hydrated magnesium sulfate composition is most appropriately a fraction of the core diameter, usually between 0.1 and 1.0 millimeter in thickness. Nevertheless, considerable variation in these sizes is feasible.

The primary and important component of the encasing composition is hydrated magnesium sulfate. However, other salts or innocuous inert diluents can be included. In some instances, inert salt diluents may be used, for example, to increase the rate at which the products dissolve in water. Perphthalic acids (one or more) constitute the primary, preferably the sole, core constituent with diperisophthalic acid being the preferred perphthalic acid bleaching component. Other perphthalic acids including mono- and diperacids of phthalic and terephthalic and the halogenated (especially fluorinated and chlorinated) phthalic acids may be used. Inert diluents can, nevertheless, be included in the perphthalic acid core.

While the present invention has been described with respect to specific details of certain embodiments, it is to be understood that it is not intended that the invention be construed as limited to such details.

I claim:

1. A dry particulate composition comprising solid dry particles having a perphthalic acid core encased in a protective coating of hydrated magnesium sulfate containing as water of hydration from 0.5 to 4.0 parts of water per part of the encased perphthalic acid, the magnesium sulfate heptahydrate content of the protective coating being less than 10 percent by weight of the hydrated magnesium sulfate.

2. The composition of claim 1 wherein the perphthalic acid is diperthalic acid.

3. The composition of claim 1 wherein the particles are substantially spherical.

4. A method of producing dry solid particles having a perphthalic acid core encapsulated in a protective coating of hydrated magnesium sulfate which comprises preparing dry solid particles having a perphthalic acid core encapsulated in a protective coating of hydrated magnesium sulfate by contacting the perphthalic acid with magnesium sulfate in the presence of water, the amount of water present being sufficient to form magnesium sulfate heptahydrate by hydration of magnesium sulfate, thereby forming dry solid particles of the perphthalic acid encased in hydrated magnesium sulfate and thereafter heating said encapsulated dry solid particles to a temperature and for a period of time until the magnesium sulfate heptahydrate content of the hydrated magnesium sulfate protective coating is reduced to below 10 percent by weight.

5. The method of claim 4 wherein the heating is at from 30° C. to 70° C. and for 30 minutes to 24 hours.

6. A dry particulate composition comprising solid dry particles having a diperisophthalic acid core encased in a protective coating of hydrated magnesium sulfate, said coating containing between 0.5 and 4.0 parts water of hydration per part of diperisophthalic acid, and 0.5 to 5 parts magnesium sulfate per part by weight of the diperisophthalic acid, the magnesium sulfate heptahydrate content of said coating being from 1 to 10 percent by weight of the hydrated magnesium sulfate.

References Cited

UNITED STATES PATENTS

| 2,287,064 | 6/1942 | Reichert et al. | 260—502 X |
| 2,347,434 | 4/1944 | Reichert et al. | 260—502 |
| 2,423,451 | 7/1947 | Holuba | 117—100 X |
| 2,448,252 | 8/1948 | Cornthwaite et al. | 260—502 |
| 3,231,605 | 1/1966 | Blumbergs | 260—502 |

FOREIGN PATENTS

| 560,389 | 9/1957 | Belgium. |

WILLIAM D. MARTIN, Primary Examiner

MATHEW R. P. PERRONE, Jr., Assistant Examiner

U.S. Cl. X.R.

252—95; 260—502

PO-1050
(5/69)

UNITED STATES PATENT OFFICE
CERTIFICATE OF CORRECTION

Patent No. 3,494,786      Dated February 10, 1970

Inventor(s) Donald R. Nielsen

It is certified that error appears in the above-identified patent and that said Letters Patent are hereby corrected as shown below:

In Column 4, line 50, the word "diperthalic" should be --diperphthalic--.

SIGNED AND
SEALED
SEP 1 - 1970

(SEAL)
Attest:

Edward M. Fletcher, Jr.
Attesting Officer

WILLIAM E. SCHUYLER, JR.
Commissioner of Patents